United States Patent
Ha et al.

(10) Patent No.: US 9,086,526 B2
(45) Date of Patent: Jul. 21, 2015

(54) PHOTOCURABLE ADHESIVE COMPOSITION, MODULE APPARATUS USING THE SAME, AND METHOD OF ASSEMBLING A MODULE

(75) Inventors: Kyoung Jin Ha, Uiwang-si (KR); Ji Hye Kwon, Uiwang-si (KR); Kil Sung Lee, Uiwang-si (KR); Irina Nam, Uiwang-si (KR); Lee June Kim, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 164 days.

(21) Appl. No.: 13/336,072

(22) Filed: Dec. 23, 2011

(65) Prior Publication Data
US 2012/0172481 A1    Jul. 5, 2012

(30) Foreign Application Priority Data
Dec. 31, 2010    (KR) .................... 10-2010-0140044

(51) Int. Cl.
| | |
|---|---|
| G02B 1/04 | (2006.01) |
| C08G 18/67 | (2006.01) |
| C08G 18/72 | (2006.01) |
| C08G 18/75 | (2006.01) |
| C08G 18/79 | (2006.01) |
| C09J 175/16 | (2006.01) |

(52) U.S. Cl.
CPC .............. *G02B 1/041* (2013.01); *C08G 18/672* (2013.01); *C08G 18/725* (2013.01); *C08G 18/755* (2013.01); *C08G 18/792* (2013.01); *C09J 175/16* (2013.01); *G02F 2202/28* (2013.01)

(58) Field of Classification Search
CPC ......... C08L 75/16; C08L 75/14; C08L 75/06; C08L 75/08; G02F 1/133788; G02F 2202/28; C08F 299/06; C08F 299/065
USPC ........... 428/343, 345, 355 R, 355 CN, 355 N, 428/355 AC
See application file for complete search history.

(56) References Cited

U.S. PATENT DOCUMENTS

| | | | | |
|---|---|---|---|---|
| 5,466,723 A | * | 11/1995 | Dotson ........................ | 522/96 |
| 5,475,038 A | * | 12/1995 | Skoultchi .................... | 522/96 |
| 6,440,519 B1 | * | 8/2002 | Takase et al. ................ | 428/65.2 |
| 6,596,787 B1 | * | 7/2003 | Levandoski et al. .......... | 522/96 |
| 7,268,173 B2 | * | 9/2007 | Graichen et al. ............. | 522/96 |
| 7,595,352 B2 | * | 9/2009 | Choi et al. ................... | 522/95 |
| 7,696,258 B2 | * | 4/2010 | Choi et al. ................... | 522/95 |
| 2010/0247924 A1 | * | 9/2010 | Nemoto ....................... | 428/423.1 |

FOREIGN PATENT DOCUMENTS

| | | | |
|---|---|---|---|
| CN | 1662622 A | | 8/2005 |
| CN | 1688623 A | | 10/2005 |
| CN | 1995259 A | | 7/2007 |
| JP | 2004-115757 A | | 4/2004 |
| JP | 2005049507 A | * | 2/2005 |
| JP | 2008184538 A | * | 8/2008 |
| JP | 2008248199 A | * | 10/2008 |
| JP | 455588 B2 | | 10/2010 |
| JP | 2010224433 A | * | 10/2010 |
| TW | 200902663 A | | 1/2009 |

OTHER PUBLICATIONS

IGM Resins UV Radcure Portfolio (Photomer) Catalog. (2012). [online]. {Retrieved online on Nov. 14, 2013]. Retrieved from <URL:/http://igmresins.com/public/upload/product/brochure/PI_Brochure_EN_20130604.pdf>.*

Sartiner. Acrylate and Methacrylate Resins. European Photocure Product guide. (Mar. 2009). [online]. [Retrieved online on Nov. 14, 2013]. Retrieved from <URL://http://www.sartomereurope.com/TechLit/Sartomer%20Europe%20-%20Product%20Guide%20-%20%20Photocure.pdf://>.*

Sartomer. Technical Data Sheet for CN966H90 (Jul. 2011). [online]. [Retrieved online on Nov. 14, 2013]. Retrived from <URL://http://www.sartomer.com/prodselectdetail.asp?apid=2&plid=2&sgid=14&prid=CN966H90>.*

Chinese Office Action in CN 201110454111.6, dated May 13, 2013 (Ha, et al.).

Office Action mailed Jan. 13, 2014 in corresponding Chinese Patent Application No. 201110454111.6.

Office Action/Search Report mailed Jan. 13, 2014 in corresponding Taiwanese Patent Application No. 100147970.

Office Action/Search Report mailed Nov. 13, 2014 in related Taiwanese Patent Application No. 100147970.

* cited by examiner

*Primary Examiner* — Sanza McClendon
(74) *Attorney, Agent, or Firm* — Lee & Morse, P.C.

(57) ABSTRACT

A photocurable adhesive composition, a module apparatus, and a method of assembling a module, the composition including a urethane (meth)acrylate binder, the composition having a viscosity of about 3,000 to about 6,000 cps at 25° C., and providing an adhesive film having an adhesive strength of about 30 N/cm² or more.

32 Claims, 4 Drawing Sheets

PHOTOCURABLE ADHESIVE COMPOSITION, MODULE APPARATUS USING THE SAME, AND METHOD OF ASSEMBLING A MODULE

BACKGROUND

1. Field

Embodiments relate to a photocurable adhesive composition, and a module apparatus using the same, and a method of assembling a module.

2. Description of the Related Art

A mobile display apparatus including, e.g., a mobile phone, may include a liquid crystal display (LCD) panel and a backlight unit. Recently, there has been a general trend to enlarge a display window of a mobile phone.

SUMMARY

Embodiments are directed to a photocurable adhesive composition, and a module apparatus using the same, and a method of assembling a module.

The embodiments may be realized by providing a photocurable adhesive composition including a urethane (meth)acrylate binder, the composition having a viscosity of about 3,000 to about 6,000 cps at 25° C., and providing an adhesive film having an adhesive strength of about 30 N/cm² or more after curing.

The composition may provide an adhesive film having an adhesive strength of about 30 to about 50 N/cm² after curing.

The photocurable adhesive composition may further include a photocurable monomer, an adhesion enhancing monomer, and a photoinitiator.

The photocurable adhesive composition may further include a silane coupling agent.

The photocurable monomer may include at least one selected from the group of a hydroxyl group containing (meth)acrylic acid ester, a C4 to C20 alicyclic ring containing (meth)acrylic acid ester, and a carboxyl group containing vinyl monomer.

The adhesion enhancing monomer may include at least one selected from the group of acryloyl morpholine, 2-hydroxyethyl(meth)acrylate phosphate, phosphated epoxy (meth)acrylate, 2-methyl-2-phosphonooxyethyl ester, and tetrahydrofurfuryl (meth)acrylate.

The urethane (meth)acrylate binder may have a weight average molecular weight of about 10,000 to about 50,000 g/mol and a viscosity of about 20,000 to about 40,000 cps at 25° C.

The urethane (meth)acrylate binder may be present in the composition in an amount of about 50 to about 80 wt %.

The embodiments may also be realized by providing a module apparatus including an adhesive film prepared using the photocurable adhesive composition according to an embodiment.

The embodiments may also be realized by providing a photocurable adhesive composition including a urethane (meth)acrylate binder, the composition having a modulus of about 2,000 to about 6,000 Pa at 25° C., and providing an adhesive film having an adhesive strength of about 30 N/cm² or more.

The composition may provide an adhesive film having an adhesive strength of about 30 to about 50 N/cm².

The photocurable adhesive composition may further include a photocurable monomer, an adhesion enhancing monomer, and a photoinitiator.

The photocurable adhesive composition may further include a silane coupling agent.

The photocurable monomer may include at least one selected from the group of a hydroxyl group containing (meth)acrylic acid ester, a C4 to C20 alicyclic ring containing (meth)acrylic acid ester, and a carboxyl group containing vinyl monomer.

The adhesion enhancing monomer may include at least one selected from the group of acryloyl morpholine, 2-hydroxyethyl(meth)acrylate phosphate, phosphated epoxy (meth)acrylate, 2-methyl-2-phosphonooxyethyl ester, and tetrahydrofurfuryl (meth)acrylate.

The urethane (meth)acrylate binder may have a weight average molecular weight of about 10,000 to about 50,000 g/mol and a viscosity of about 20,000 to about 40,000 cps at 25° C.

The urethane (meth)acrylate binder may be present in the composition in an amount of about 50 to about 80 wt %.

The embodiments may also be realized by providing a module apparatus including an adhesive film prepared using the photocurable adhesive composition according to an embodiment.

The embodiments may also be realized by providing a photocurable adhesive composition including a urethane (meth)acrylate binder, a photocurable monomer, an adhesion enhancing monomer, and a photoinitiator, wherein the composition has a surface energy of about 50 to about 70 dyne.

The photocurable adhesive composition may further include a silane coupling agent.

An applied part formed by depositing the photocurable adhesive composition onto a glass substrate may have a ratio of a thickness to a maximum diameter of about 1:5 or less.

The ratio may be about 1:8 or less.

The urethane (meth)acrylate binder may have a weight average molecular weight of about 10,000 to about 50,000 g/mol and a viscosity of about 20,000 to about 40,000 cps at 25° C.

The urethane (meth)acrylate binder may be present in the composition in an amount of about 50 to about 80 wt %.

The embodiments may also be realized by providing a module apparatus including an adhesive film prepared using the photocurable adhesive composition according to an embodiment.

The embodiments may also be realized by providing a method of assembling a module, the method including bonding a liquid crystal display (LCD) panel to a top surface of a backlight unit; applying a photocurable adhesive composition to adjacent sides of the backlight unit and the LCD panel; curing the photocurable adhesive composition; and mounting the backlight unit and the LCD panel on a frame.

The photocurable adhesive composition may be applied to a thickness of about 150 μm or less.

Curing the photocurable adhesive composition may include irradiating the photocurable adhesive composition at about 10,000 mJ/cm² or less.

Curing the photocurable adhesive composition may be performed prior to mounting the backlight unit and the LCD panel on the frame.

Mounting the backlight unit and the LCD panel on the frame may be performed prior to applying the photocurable adhesive composition to the adjacent sides of the backlight unit and the LCD panel.

The method may further include injecting a thermoplastic resin into a space formed by mounting the backlight unit and the LCD panel to the frame, the space being surrounded by the LCD panel, the cured photocurable adhesive composition, and the frame.

The thermoplastic resin may have a viscosity of about 300 to about 1,200 cps at 120 to 130° C.

The thermoplastic resin may include at least one selected from the group of hot-melt type silicone adhesives, ethylene-vinyl acetate resins, ethylene acetate-free vinyl resins, and acrylic resins.

BRIEF DESCRIPTION OF DRAWINGS

The embodiments will become apparent to those of ordinary skill in the art by describing in detail exemplary embodiments with reference to the attached drawings, in which.

DETAILED DESCRIPTION

Figure 1:
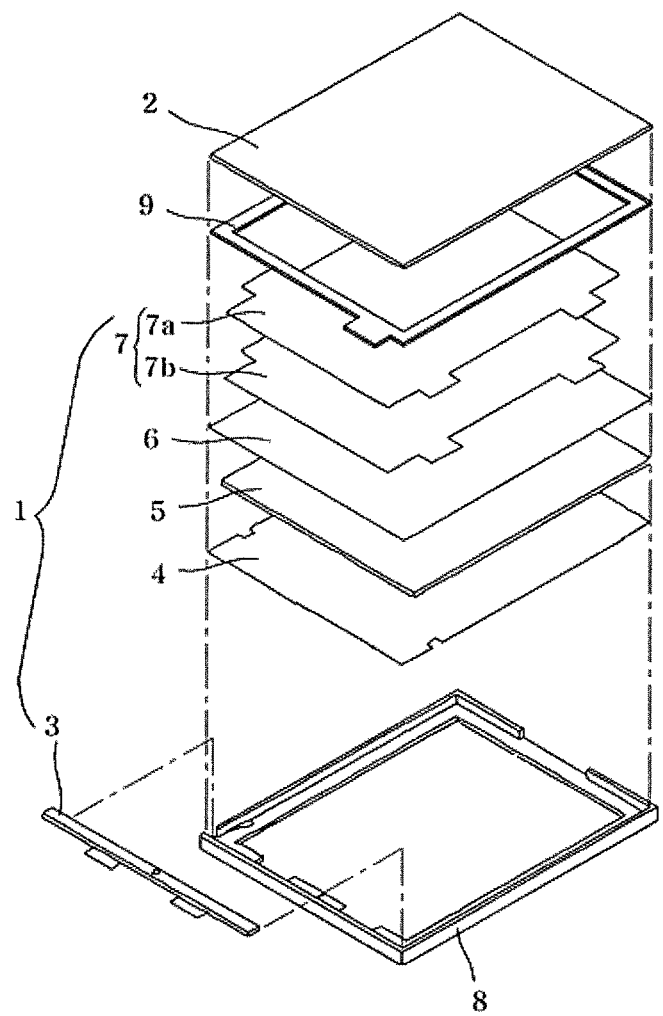
FIG. 1 illustrates a schematic view of a liquid crystal display module used for a mobile phone.

Korean Patent Application No. 10-2010-0140044, filed on Dec. 31, 2010, in the Korean Intellectual Property Office, and entitled: "Photocurable Adhesive Composition, Method of Assembling Module of Mobile Phone Using the Same, and Module Apparatus Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

FIG. 1 schematically illustrates a structure of an LCD module for a mobile phone. Referring to FIG. 1, an LCD module of a mobile phone may include a backlight unit 1 and an LCD panel 2. The backlight unit 1 may include a sequentially stacked lamp 3, e.g., an LED, a reflective sheet 4, a light guide plate 5, a diffuser sheet 6, and prism sheets 7 including a horizontal prism sheet 7a and a vertical prism sheet 7b. The light guide plate 5 and the sheets 3, 4, 6, and 7 may be secured by an aluminum frame 8, which constitutes an outer appearance of the backlight unit 1.

Figure 2:
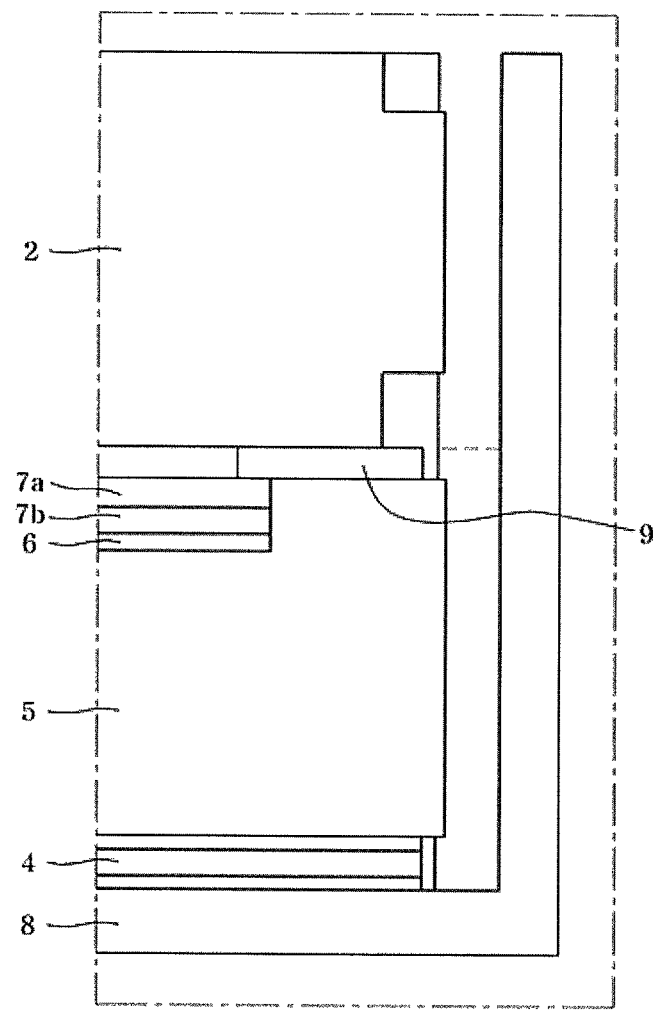
FIG. 2 illustrates a side view of the module of FIG. 1, in which a backlight unit and a liquid crystal display panel are assembled by a rim tape.

The backlight unit 1 and the LCD panel 2 may be secured to each other by an adhesive film 9, e.g., a rim tape, which may be coated with adhesive on both sides thereof. FIG. 2 illustrates a side view of an LCD module of a mobile phone, in which a backlight unit and an LCD panel are secured to each other by a rim tape. The rim tape may have a width of 2.1 to 2.2 mm.

An embodiment provides a photocurable adhesive composition for preparing an adhesive film having an adhesive strength of about 30 N/cm$^2$ or higher after curing. A backlight unit may be formed of an organic material, e.g., polycarbonate, and a liquid crystal display (LCD) panel may include an inorganic material, e.g., glass. For example, the backlight unit and the LCD panel may be formed of different materials. Thus, the adhesive composition should form an adhesive film having good adhesive strength to both the organic material and the inorganic material to assemble the backlight unit and the LCD panel. Maintaining the adhesive strength of the adhesive film prepared from the adhesive composition at about 30 N/cm$^2$ or higher may help ensure a proper bond between the backlight unit and the LCD panel during assembly of the module. In an implementation, the adhesive strength of the adhesive film prepared from the adhesive composition may be about 30 to about 50 N/cm$^2$ after curing.

Adhesive strength may be measured by a general adhesion measuring method. For example, the photocurable adhesive composition may be placed between a 1.5 cm×1.5 cm upper glass substrate and a 3 cm×3 cm polycarbonate film and cured by UV irradiation (to form an adhesive film), after which a force at which the lower polycarbonate film is separated (broken) when pushing the upper glass substrate to one side may be measured.

The photocurable adhesive composition may have a viscosity of about 3,000 to about 6,000 cps at 25° C. In assembling a module, the LCD panel may be vertically stacked on a top surface of the backlight unit. Thus, in order for the adhesive composition to be applied to adjacent sides of the backlight unit and the LCD panel to bond and combine the backlight unit and the LCD panel in the stacked structure of the backlight unit and the LCD panel, the adhesive composition should have a particular viscosity. Maintaining the viscosity at about 3,000 cps or higher may help ensure that flowability of the adhesive composition is not too high, thus helping to prevent the applied composition from flowing to the bottom of a frame via the backlight unit, thereby helping to ensure sufficient bonding of the backlight unit to the LCD panel and a good connection. Maintaining the viscosity at about 6,000 cps of less may help ensure that the composition is suitably discharged to both the backlight unit and to the LCD panel. In an implementation, the viscosity may be about 3,500 to about 5,000 cps.

Viscosity may be measured with, e.g., a Brookfield viscometer, DV-II+, at 25° C. and at 100 rpm using a #7 spindle.

The photocurable adhesive composition may have a modulus of about 2,000 to about 6,000 Pa. Maintaining the modulus at about 2,000 Pa or greater may help ensure that adhesion to glass and polycarbonate is not higher than internal cohesion of the adhesive, thus facilitating removal of the adhesive from the surface of a material. Maintaining the modulus at about 6,000 Pa or less may help ensure sufficiently low internal cohesion of the adhesive, thus ensuring good adhesion to glass and polycarbonate, e.g., good adhesive strength.

Modulus may be measured by dynamic mechanical analysis (DMA, DMA/TMA PT 1000, Linseis). For example, modulus may be obtained by measuring storage modulus at a fixed temperature of 25° C. while changing frequency from 1 to 10 rad.

The photocurable adhesive composition may have a surface energy of about 50 to about 70 dyne. In order to bond the backlight unit to the LCD panel, the adhesive composition should sufficiently cover adjacent sides of the backlight unit and the LCD panel after application. A mobile phone may have a very narrow distance, e.g., about 150 to about 200 μm, between the bonded LCD panel and backlight unit and a frame surrounding the LCD panel and the backlight unit. Thus, in order to bond the backlight unit to the LCD panel using the adhesive composition, the applied adhesive composition should have a maximum thickness of about 150 μm. In a typical liquid, when an applied part has a thickness of about 150 μm, a ratio of the thickness of the applied part to a maximum diameter may be about 1:5 or less. Thus, the liquid may not sufficiently cover the backlight unit and the LCD panel. However, the photocurable adhesive composition according to an embodiment may have a surface energy of about 50 to about 70 dyne to sufficiently cover the backlight unit and the LCD panel when applied to adjacent sides of the backlight unit and the LCD panel.

An applied part formed by depositing the photocurable adhesive composition may have a ratio of thickness to maximum diameter of about 1:8 or less, thereby sufficiently covering the backlight unit and the LCD panel.

The photocurable adhesive composition according to an embodiment may include a urethane (meth)acrylate binder, a photocurable monomer, an adhesion enhancing monomer, and a photoinitiator.

Urethane (meth)acrylate Binder

The urethane (meth)acrylate binder may have a weight average molecular weight of about 10,000 to about 50,000 g/mol and a viscosity of about 20,000 to about 40,000 cps at 25° C. The urethane (meth)acrylate binder may include a copolymer prepared by copolymerizing, e.g., a polyol, a monomer including an isocyanate group, and a (meth)acrylate monomer.

To assemble the backlight unit and the LCD panel, good adhesion and reworkability are desirable. The urethane (meth)acrylate binder may use polypropylene glycol (having excellent hydrophilic properties) as a main ingredient and thus may properly adhere to glass and a polycarbonate material. Further, the urethane (meth)acrylate binder may have excellent reworkability due to intrinsically high cohesion thereof, thereby providing excellent adhesion and reworkability.

The urethane (meth)acrylate binder may be present in the photocurable adhesive composition in an amount of about 50 to about 80 wt %. Within this range, high cohesion may be obtained after photo-curing and high adhesion to a substrate may be secured.

Photocurable Monomer

The photocurable monomer may include at least one selected from the group of a hydroxyl group containing vinyl monomer, a carboxyl group containing vinyl monomer, an alicyclic ring containing vinyl monomer, and an alkyl group containing vinyl monomer.

The photocurable monomer may be present in the photocurable adhesive composition in an amount of about 15 to about 45 wt %. Within this range, the viscosity of photocurable materials may be lowered, and contraction after curing may be minimized. In an implementation, the photocurable monomer may be present in an amount of about 15 to about 35 wt %.

The hydroxyl group containing vinyl monomer may include a hydroxyl group containing (meth)acrylic acid ester. The hydroxyl group containing (meth)acrylic acid ester may refer to a (meth)acrylic acid ester having a hydroxyl group and a C2 to C10 alkyl group, and may include at least one selected from the group of 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxy-3-phenyloxypropyl (meth)acrylate, 4-hydroxycyclohexyl (meth)acrylate, and cyclohexane dimethanol mono(meth)acrylate, without being limited thereto. The hydroxyl group containing monomer may be present in the photocurable monomer in an amount of about 20 to about 40 wt %. Within this range, the photocurable monomer may exhibit excellent compatibility with the urethane acrylate binder, may have no color and smell, and may contribute to adhesion to glass.

The carboxyl group containing vinyl monomer may include at least one selected from the group of (meth)acrylic acid, itaconic acid, maleic acid, and fumaric acid, without being limited thereto. The carboxyl group containing monomer may be present in the photocurable monomer in an amount of about 1 to about 20 wt %. Within this range, adhesion to glass and a polycarbonate material may be effectively raised to a certain degree.

The alicyclic ring containing vinyl monomer may include a (meth)acrylic acid ester having a C4 to C20 monocyclic or polycyclic alicyclic ring. For example, the alicyclic ring containing vinyl monomer may include at least one selected from the group of isobornyl (meth)acrylate, cyclopentyl (meth)acrylate, and cyclohexyl (meth)acrylate, without being limited thereto. The alicyclic ring containing monomer may be present in the photocurable monomer in an amount of about 40 to about 60 wt %. Within this range, the viscosity of the composition before curing may be lowered, and a modulus after curing may be maintained at a certain level to effectively maintain the strength of a film at a certain level.

The alkyl group containing vinyl monomer may include (meth)acrylic acid alkyl ester. The (meth)acrylic acid alkyl ester may include (meth)acrylic acid ester having a linear or branched alkyl group with 1 to 20 carbon atoms in the ester moiety. For example, the (meth)acrylic acid alkyl ester may include at least one selected from the group of methyl(meth)acrylate, ethyl(meth)acrylate, n-propyl(meth)acrylate, iso-propyl(meth)acrylate, n-butyl(meth)acrylate, t-butyl(meth)acrylate, iso-butyl(meth)acrylate, pentyl(meth)acrylate, hexyl(meth)acrylate, heptyl(meth)acrylate, octyl(meth)acrylate, nonly(meth)acrylate, decyl(meth)acrylate, undecyl (meth)acrylate, and lauryl (meth)acrylate, without being limited thereto. The alkyl group containing vinyl monomer may be present in the photocurable monomer in an amount of about 10 to about 40 wt %, e.g., about 20 to about 40 wt %. Within this range, a film prepared from the composition may maintain a certain level of tack after curing, thereby favorably adhering to both glass and a polycarbonate material.

Adhesion Enhancing Monomer

The adhesion enhancing monomer may include at least one selected from the group of acryloyl morpholine, a silane group containing monomer, and a phosphate monomer, without being limited thereto.

The phosphate monomer may include at least one selected from the group of 2-hydroxyethyl (meth)acrylate phosphate, phosphated epoxy acrylate, 2-methyl-2-phosphonooxy ethyl ester, and tetrahydrofurfuryl (meth)acrylate.

The phosphated epoxy acrylate may be prepared by reaction of phenylphosphonic acid (PPA) and 2,2-bis(4-glycidyloxy phenyl)-propane (DGB) at a molar ratio of 1:2, followed by reaction with 1 mole of acrylic acid.

The adhesion enhancing monomer may be present in the photocurable adhesive composition in an amount of about 1 to about 20 wt %. Within this range, excellent adhesion to glass may be exhibited and proper adhesion to polycarbonate may be obtained.

Photoinitiator

The photoinitiator may include at least one selected from the group of benzophenones, acetophenones, triazines, thioxanthone, benzoins, and oximes, without being limited thereto. Examples of the photoinitiator may include benzophenone, 4-phenylbenzophenone, hydroxybenzophenone, acrylated benzophenone, 4,4'-bis(dimethylamino)benzophenone, 4,4'-bis(diethylamino)benzophenone, 2,2'-diethoxyacetophenone, 2,2'-dibutoxyacetophenone, 2-hydroxy-2-methylpropiophenone, 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, thioxanthone, 2-methylthioxanthone, benzoin, and benzoin methyl ether.

The photoinitiator may be present in the photocurable adhesive composition in an amount of about 0.1 to about 8 wt %. Within this range, fast curing properties may be obtained and a deep or thick part may be effectively cured. In an implementation, the photoinitiator may be present in the photocurable adhesive composition in an amount of about 1 to about 5 wt %.

Silane Coupling Agent

In an implementation, the photocurable adhesive composition may further include a silane coupling agent to, e.g., enhance adhesion to the LCD panel. The silane coupling agent may include any suitable silane coupling agent including, e.g., a vinyl group or a mercapto group. For example, the silane coupling agent may include at least one selected from the group of polymerizable unsaturated group containing silicon compounds, such as trimethoxysilane, vinyltriethoxysilane, and (meth)acryloxypropyltrimethoxysilane; silicon compounds having an epoxy structure, such as 3-glycidoxypropyltrimethoxysilane 3-glycidoxypropylmethyldimethoxysilane and 2-(3,4-epoxycyclohexyl)ethyltrimethoxysilane; amino group containing silicon compounds, such as 3-aminopropyltrimethoxysilane, N-(2-aminoethyl)-3-aminopropyltrimethoxysilane and N-(2-aminoethyl)-3-aminopropylmethyldimethoxysilane; and 3-chloropropyltrimethoxysilane, without being limited thereto.

When included in the photocurable adhesive composition, the silane coupling agent may be present in an amount of up to about 5 wt %. Within this range, excellent adhesion to glass may be exhibited. In an implementation, the silane coupling agent may be present in an amount of about 0.5 to about 3 wt %.

Another embodiment provides a method of assembling a module. In the present embodiment, the method of assembling the module may include bonding an LCD panel to a top surface of a backlight unit; applying a photocurable adhesive composition to adjacent sides of the backlight unit and the LCD panel; curing the photocurable adhesive composition; mounting the backlight unit and the LCD panel on an, e.g., aluminum, frame, and securing the backlight unit and the LCD panel to the aluminum frame.

Figure 3:
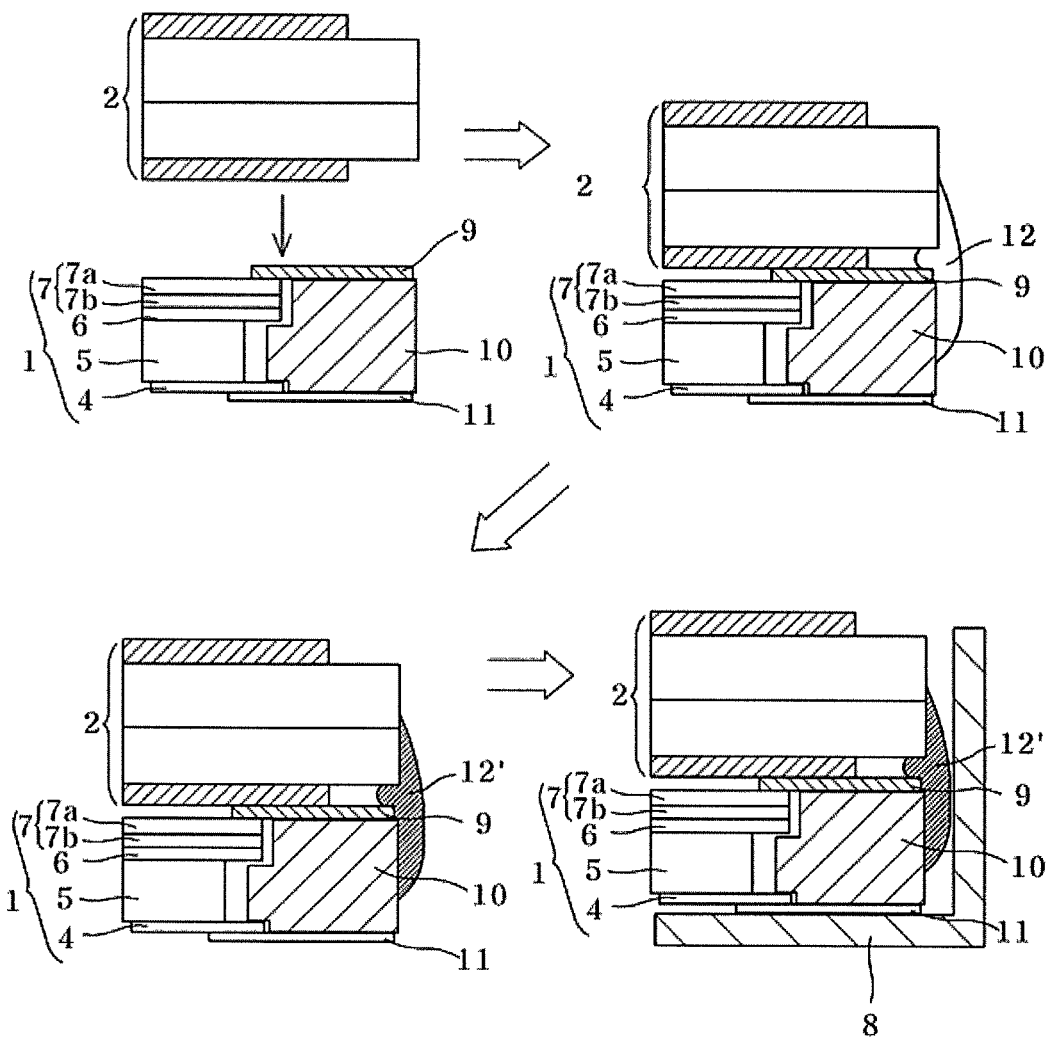
FIG. 3 illustrates stages in a method of assembling a module according to an embodiment.

FIG. 3 illustrates stages in the method of assembling the module according to the present embodiment.

The LCD panel 2 may be bonded to a top surface of the backlight unit 1 (including a reflective sheet 4, a light guide plate 5, a diffuser sheet 6, prism sheets 7, and a polycarbonate frame 10).

The bonding method is not particularly limited, and may use a rim tape 9 having a width of about 20 to about 100 um. Examples of suitable rim tape 9 products may include 9294, 9294B, 9295, 9295B, KCD2009B (manufactured by Minnesota Mining & Manufacture (3M)), and the like. The rim tape 9 may be a double-sided tape, and may be attached at one side thereof to part of the top surface of the backlight unit 1 and attached at another side thereof to the LCD panel 1.

Next, the photocurable adhesive composition 12 may be applied to adjacent sides of the backlight unit 1 and the LCD panel 2. The photocurable adhesive composition 12 may be the composition according to an embodiment as described above. The photocurable adhesive composition 12 may be applied by any suitable method, e.g., by a jetting method, considering that a distance between the frame and the backlight unit 1 and the LCD panel 2 may be very narrow. A thickness of the applied photocurable adhesive composition 12 is not particularly limited, and may be less than about 150 µm in consideration of a distance between the frame 8, the backlight unit 1, and the LCD panel 2. An applied part formed by depositing the photocurable adhesive composition 12 to the adjacent sides of the backlight unit 1 and the LCD panel 2 may have a ratio of thickness to maximum diameter of about 1:8 or less. Within this range, the backlight unit 1 and the LCD panel 2 may be sufficiently covered.

Then, the photocurable adhesive composition 12 may be cured. By curing, the photocurable adhesive composition 12 may be converted to a photocured adhesive film 12'. Curing may be carried out subsequent to application of the photocurable adhesive composition 12. Curing may be conducted by, e.g., energy irradiation at about 10,000 mJ/cm$^2$ or less, e.g., about 5,000 to about 10,000 mJ/cm$^2$. The photocurable adhesive composition 12 may change into the photocured adhesive film 12' upon curing, and thus the method of the present embodiment may have excellent reworkability.

Next, the backlight unit 1 and the LCD panel 2 may be mounted on the aluminum frame 8 and the backlight unit 1 and the LCD panel 2 may be secured to the frame 8. Mounting on the frame 8 may be conducted subsequent to curing the photocurable adhesive composition 12. The frame 8 may be secured by an adhesive film 11 to a bottom side of the backlight unit 1. The adhesive film 11 may include any suitable adhesive film, e.g., 9294, 9294B, 9295, 9295B, and KCD2009B (3M).

In another embodiment, the method of assembling the module may include bonding the LCD panel to the top surface of the backlight unit; mounting the backlight unit and the LCD panel on the, e.g., aluminum, frame; applying the photocurable adhesive composition to adjacent sides of the backlight unit and the LCD panel; curing the photocurable adhesive composition, and securing the backlight unit and the LCD panel to the frame.

Figure 4:
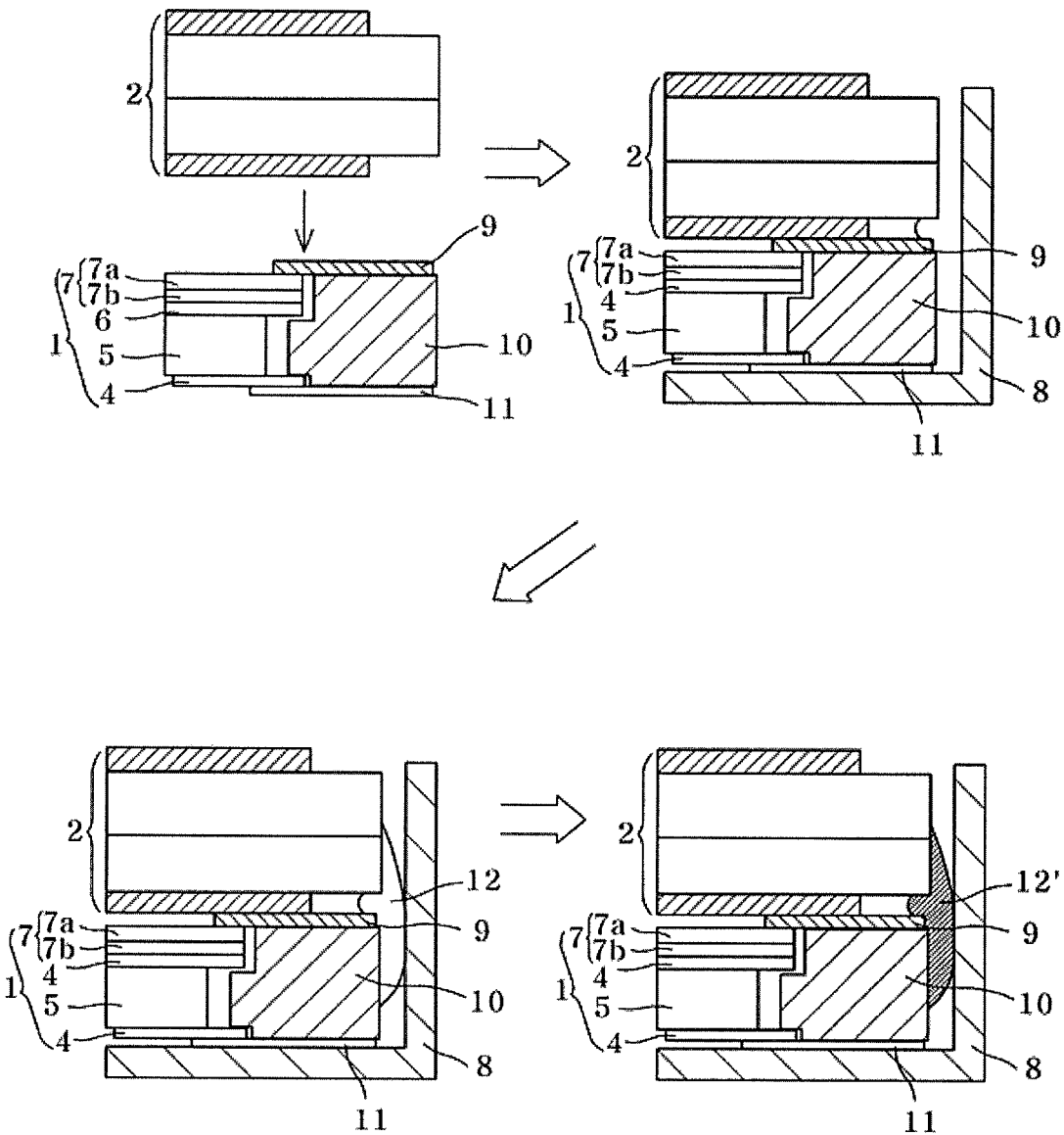
FIG. 4 illustrates stages in a method of assembling a module according to another embodiment.

FIG. 4 illustrates stages in the method of assembling the module according to the present embodiment.

The LCD panel 2 may be bonded to a top surface of the backlight unit 1 (including a reflective sheet 4, a light guide plate 5, a diffuser sheet 6, prism sheets 7, and a polycarbonate frame 10). Bonding between the LCD panel 2 and the backlight unit 1 may be conducted in the same manner as described above.

The backlight unit 1 and the LCD panel 2 may be mounted on the frame 8. The frame 8 may be mounted by an adhesive film 11 on a bottom side of the backlight unit 1. The adhesive film 11 may include any suitable adhesive film, e.g., 9294, 9294B, 9295, and 9295B (3M).

The photocurable adhesive composition 12 may be applied to adjacent sides of the backlight unit 1 and the LCD panel 2. The photocurable adhesive composition 12 and application thereof may be performed as described above. For example, a distance between the aluminum frame 8 and the coupled backlight unit 1 and LCD panel 2 may be very narrow. Thus, the photocurable adhesive composition 12 may be applied by a jetting method.

The photocurable adhesive composition 12 may be cured, and the backlight unit 1 and the LCD panel 2 may be secured to the frame. By curing, the photocurable adhesive composition 12 may be converted to a photocurable adhesive film 12'. Curing may be conducted by, e.g., energy irradiation at about 10,000 mJ/cm$^2$ or less, e.g., about 5,000 to about 10,000 mJ/cm$^2$.

The method of assembling the module may further include injecting a thermoplastic resin into a space or part formed when securing the backlight unit and the LCD panel to the frame and surrounded by the LCD panel, the cured photocurable adhesive composition, and the frame.

A curing system using a photocurable adhesive composition should increase transmittance of the composition to facilitate curing. In this case, however, as transmittance increases, light leakage may occur between the frame and the LCD panel. However, if the transmittance of the composition is reduced, high energy may be required for curing, and thus UV energy may non-uniformly infiltrate deep inside of the module after curing, so that uncured components may contaminate internal parts of a mobile phone.

The thermoplastic resin may have a viscosity of about 300 to about 1,200 cps at 120 to 130° C.

As the thermoplastic resin is injected into the space surrounded by the LCD panel 2, the cured photocurable adhesive composition 12', and the frame 8, a light leakage phenomenon may be improved, thereby completely shielding light. The thermoplastic resin should have a melting point of about 100° C. or higher and should not exhibit fluidity at 25° C. Further, in order to help shield light, the thermoplastic resin may be black or white. Examples of the thermoplastic resin may include hot-melt type silicone adhesives, ethylene-vinyl acetate resins, ethylene acetate-free vinyl resins, and acrylic resins.

The thermoplastic resin may be injected by any suitable method, e.g., using a syringe.

Another embodiment provides a module apparatus manufactured using the photocurable adhesive composition or the method of assembling the module.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

A description of details apparent to those skilled in the art will be omitted.

PREPARATIVE EXAMPLE

Preparation of Urethane (Meth)Acrylate Binder

A 1 L four-neck flask was equipped with a stirrer, a thermometer connected to a reaction controller, a condenser, and a nitrogen injection pipe. 92.02 g (0.97 equivalents) of polypropylene glycol (PPG, molecular weight: 1,000 g/mol) and 0.27 g (0.03 equivalents) of 1,4-butanediol were placed in the flask, which was then heated to 85° C. while introducing nitrogen thereto at 10 cc/min. A solution (concentration: 10%) obtained by dissolving 0.6 g of dibutyltin dilaurate (concentration: 10%, Aldrich) as a tin catalyst in toluene, 20.70 g (0.95 equivalents) of isophorone diisocyanate, and 1.92 g (0.05 equivalents) of a hexamethylene diisocyanate trimer (Desmodur N3300, Bayer) were added and reacted at 70° C. to have an isocyanate equivalent weight of 2,770 or more. The temperature of the flask was lowered to 75° C., and then 3.11 g (0.19 equivalents) of 2-hydroxyethyl methacrylate was added and reacted for 3 hours. Upon confirming that the absorption of an isocyanate group (2,270 cm$^{-1}$) was not observed in an infrared absorption spectrum, the reaction was terminated, thereby preparing a viscous liquid urethane acrylate resin.

Details of components used in Examples and Comparative Examples are as follows.

1. Urethane (meth)acrylate binder: Binder prepared in Preparative Example
2. Photocurable monomers: 2-hydroxyethyl methacrylate, isobornyl methacrylate, acrylic acid
3. Adhesion enhancing monomer: Acryloyl morpholine (Aldrich), vinyltriethoxysilane
4. Photoinitiator: 1-hydroxy-cyclohexyl-phenyl-ketone (IC-184, Ciba chemical)
5. Epoxy acrylate binder: Modified epoxy acrylate (Miramer ME2010, Miwon Commercial)
6. Acrylic acrylate binder: Acrylate oligomer (Miramer SC9211, Miwon Commercial)

Example 1

Preparation of Photocurable Adhesive Composition 58 wt % of the prepared urethane acrylate binder, 10 wt % of 2-hydroxyethyl methacrylate (as a photocurable hydroxyl group containing monomer), 20 wt % of isobornyl methacrylate (as a photocurable alicyclic monomer), 5 wt % of acrylic acid (as a photocurable carboxyl group containing monomer), 2 wt % of acryloyl morpholine (as an adhesion enhancing monomer), 2 wt % of vinyltriethoxysilane (as a silane group containing monomer), and 3 wt % of a photoinitiator were sequentially added at 25° C. and evenly stirred for 1 hour, thereby obtaining a solution.

Example 2

Preparation of Photocurable Adhesive Composition 78 wt % of the prepared urethane acrylate binder, 5 wt % of 2-hydroxyethyl methacrylate (as a photocurable hydroxyl group containing monomer), 10 wt % of isobornyl methacrylate (as a photocurable alicyclic monomer), 2 wt % of acrylic acid (as a photocurable carboxyl group containing monomer), 2 wt % of acryloyl morpholine (as an adhesion enhancing monomer), 1 wt % of vinyltriethoxysilane (as a silane group containing monomer), and 2 wt % of a photoinitiator were sequentially added at 25° C. and evenly stirred for 1 hour, thereby obtaining a solution.

Example 3

Assembling Module 0.01 to 1 mg of each of the photocurable adhesive compositions prepared in Examples 1 or 2 was applied to adjacent sides of a backlight unit and an LCD panel using a jet system, PICO Dot (774 MV-100, EFD Korea). Then, irradiation was conducted at 6,000 to 8,000 mJ/cm$^2$ using UV spot curing equipment, INO CURE-100N, to cure the photocurable adhesive composition. Immediately after curing was completed, the module was assembled with a frame.

Comparative Example 1

Preparation of Photocurable Adhesive Composition

An adhesive composition was prepared in the same manner as in Example 1 except that an epoxy acrylate binder (Miramer ME2010, Miwon Commercial) was used instead of the urethane acrylate binder.

Comparative Example 2

Preparation of Photocurable Adhesive Composition

An adhesive composition was prepared in the same manner as in Example 1 except that an acrylic acrylate binder (Miramer SC9211, Miwon Commercial) was used instead of the urethane acrylate binder.

Experiment 1

Evaluation of Physical Properties of Photocurable Adhesive Compositions

The adhesive compositions prepared in Examples and Comparative Examples were evaluated for adhesion, viscosity, modulus, and surface energy, and results are shown in Table 1, below.

<Methods for Measuring Physical Properties>

1. Adhesive Strength

Each of the photocurable adhesive compositions prepared in the Examples and Comparative Examples was placed between a 1.5 cm×1.5 cm upper glass substrate and a 3 cm×3 cm polycarbonate film and photo-cured, followed by measurement of adhesion using a DAGE-BT4000 (Richardson Electronics Korea).

2. Viscosity 400 g of each photocurable adhesive composition was put in a 500 ml Nalgene bottle (73.8 mm in external diameter× 169.8 mm in height), followed by measurement of viscosity using a Brookfield viscometer, DV-II+, at 25° C. and at 100 rpm using a #7 spindle.

3. Modulus

Dynamic mechanical analysis (DMA, DMA/TMA PT 1000, Linseis) was used. The storage modulus of each photocurable adhesive composition was measured at a fixed temperature of 25° C., a strain of 1%, and a frequency of 1 Hz using a 10 mm-diameter plate.

4. Surface Energy

20 µl of sample droplets dropped onto a glass plate from a height of 3 cm using a steel-type micro-syringe were photographed to obtain digital images, followed by measurement of contact angle using a contact angle measurement system (KRUSS). Surface energy was calculated from the contact angle using a software program.

TABLE 1

|  | Example 1 | Example 2 | Comparative Example 1 | Comparative Example 2 |
| --- | --- | --- | --- | --- |
| Adhesive strength ($N/cm^2$) | 35 | 38 | 53 | 20 |
| Viscosity (cps) | 4000 | 4500 | 3500 | 3000 |
| Modulus (Pa) | 4500 | 5200 | 8000 | 3000 |
| Surface energy (dyne) | 55 | 59 | 75 | 48 |

Experiment 2

Effectiveness Evaluation in Assembly of Mobile Phone

Each of the compositions prepared in the Examples and Comparative Examples was applied to a glass substrate and a polycarbonate substrate and examined as to coatability and reworkability to evaluate effectiveness in assembly of a mobile phone. Results are listed in Table 2, below.

TABLE 2

|  | Example 1 | Example 2 | Comparative Example 1 | Comparative Example 2 |
| --- | --- | --- | --- | --- |
| Coatability | Excellent | Excellent | Defective | Excellent |
| Reworkability | Excellent | Excellent | Defective | Defective |

When applied to the glass substrate and the polycarbonate substrate, the compositions of Examples 1 and 2 were stably deposited on the middle between the glass substrate and the polycarbonate substrate, whereas the composition of Comparative Example 1 leaned to the glass substrate. Further, as to reworkability, films of the compositions of Examples 1 and 2 were readily removed after photo-curing, while the composition of Comparative Example 1 was firmly attached to glass and thus was not easily removed. The composition of Comparative Example 2 was soft and thus remained on a substrate upon separation.

By way of summation and review, there may be a limit in enlargement of the display window of the mobile phone using the rim tape having a narrow width. For example, there may be mechanical difficulty in cutting the rim tape having a width of 2.1 to 2.2 mm to a width of 1 mm or less and in using such a rim tape after cutting.

Further, when the backlight unit and the LCD panel are bonded to each other using the rim tape with a width of 2.1 mm cut to have a width of 1 mm or less, adhesion may be deteriorated to half or less that of the original rim tape. Such deterioration of adhesion may weaken adhesion between a window glass material used for the LCD panel and a polycarbonate material used for the backlight unit, such that coupling between the backlight unit and the LCD panel may be damaged or completely fail even due to weak impact.

The embodiments provide a photocurable adhesive composition having properties that facilitate bonding of the backlight unit to the LCD panel to be suited for an enlarged display of a mobile phone.

The embodiments provide a photocurable adhesive composition that has adhesion, viscosity, and surface energy within a particular range and is used to assemble a liquid crystal display panel and a backlight unit of, e.g., a mobile phone.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A photocurable adhesive composition, comprising:
a urethane (meth)acrylate binder;
a photocurable monomer;
a photoinitiator; and
an adhesion enhancing monomer,
the composition having a viscosity of about 3,000 to about 6,000 cps at 25° C.,
the composition providing an adhesive film having an adhesive strength to glass of about 30 N/cm$^2$ to about 50 N/cm$^2$ after curing, wherein the adhesive strength is measured between a glass substrate and a polycarbonate film,
the composition having a storage modulus of about 2,000 to about 6,000 Pa at 25° C.,
the adhesion enhancing monomer including at least one selected from the group of acryloyl morpholine, 2-hydroxyethyl(meth)acrylate phosphate, phosphated epoxy (meth)acrylate, 2-methyl-2-phosphonooxyethyl ester, and tetrahydrofurfuryl (meth)acrylate, and
the photocurable monomer including a hydroxyl group containing (meth)acrylic acid ester, a C4 to C20 alicyclic ring containing (meth)acrylic acid ester, and a carboxyl group containing vinyl monomer.

2. The photocurable adhesive composition as claimed in claim 1, further comprising a silane coupling agent.

3. The photocurable adhesive composition as claimed in claim 1, wherein the urethane (meth)acrylate binder has a weight average molecular weight of about 10,000 to about 50,000 g/mol and a viscosity of about 20,000 to about 40,000 cps at 25° C.

4. The photocurable adhesive composition as claimed in claim 3, wherein the urethane (meth)acrylate binder is present in the composition in an amount of about 50 to about 80 wt %.

5. A module apparatus including an adhesive film prepared using the photocurable adhesive composition as claimed in claim 1.

6. A photocurable adhesive composition, comprising:
a urethane (meth)acrylate binder;
a photocurable monomer;
a photoinitiator; and
an adhesion enhancing monomer,
the composition having a storage modulus of about 2,000 to about 6,000 Pa at 25° C.,
the composition providing an adhesive film having an adhesive strength to glass of about 30 N/cm$^2$ or more after curing,
the adhesion enhancing monomer including at least one selected from the group of acryloyl morpholine, 2-hydroxyethyl(meth)acrylate phosphate, phosphated epoxy (meth)acrylate, 2-methyl-2-phosphonooxyethyl ester, and tetrahydrofurfuryl (meth)acrylate and
the photocurable monomer including a hydroxyl group containing (meth)acrylic acid ester, a C4 to C20 alicyclic ring containing (meth)acrylic acid ester, and a carboxyl group containing vinyl monomer.

7. The photocurable adhesive composition as claimed in claim 6, wherein the composition provides an adhesive film having an adhesive strength to glass of about 30 to about 50 N/cm$^2$ after curing.

8. The photocurable adhesive composition as claimed in claim 6, further comprising a silane coupling agent.

9. The photocurable adhesive composition as claimed in claim 6, wherein the urethane (meth)acrylate binder has a weight average molecular weight of about 10,000 to about 50,000 g/mol and a viscosity of about 20,000 to about 40,000 cps at 25° C.

10. The photocurable adhesive composition as claimed in claim 9, wherein the urethane (meth)acrylate binder is present in the composition in an amount of about 50 to about 80 wt %.

11. A module apparatus including an adhesive film prepared using the photocurable adhesive composition as claimed in claim 6.

12. A photocurable adhesive composition, comprising:
a urethane (meth)acrylate binder,
a photocurable monomer,
an adhesion enhancing monomer, the adhesion enhancing monomer including at least one selected from the group of acryloyl morpholine, 2-hydroxyethyl(meth)acrylate phosphate, phosphated epoxy (meth)acrylate, 2-methyl-2-phosphonooxyethyl ester, and tetrahydrofurfuryl (meth)acrylate, and
a photoinitiator,
the composition having a storage modulus of about 2,000 to about 6,000 Pa at 25° C.,
the photocurable monomer including a hydroxyl group containing (meth)acrylic acid ester, a C4 to C20 alicyclic ring containing (meth)acrylic acid ester, and a carboxyl group containing vinyl monomer, and
wherein the composition has a surface energy of about 50 to about 70 dyne.

13. The photocurable adhesive composition as claimed in claim 12, further comprising a silane coupling agent.

14. The photocurable adhesive composition as claimed in claim 12, wherein an applied part formed by depositing the photocurable adhesive composition onto a glass substrate has a ratio of a thickness to a maximum diameter of about 1:5 or less.

15. The photocurable adhesive composition as claimed in claim 14, wherein the ratio is about 1:8 or less.

16. The photocurable adhesive composition as claimed in claim 12, wherein the urethane (meth)acrylate binder has a weight average molecular weight of about 10,000 to about 50,000 g/mol and a viscosity of about 20,000 to about 40,000 cps at 25° C.

17. The photocurable adhesive composition as claimed in claim 16, wherein the urethane (meth)acrylate binder is present in the composition in an amount of about 50 to about 80 wt %.

18. A module apparatus including an adhesive film prepared using the photocurable adhesive composition as claimed in claim 12.

19. A method of assembling a module, the method comprising:
bonding a liquid crystal display (LCD) panel to a top surface of a backlight unit;
applying the photocurable adhesive composition as claimed in claim 1 to adjacent sides of the backlight unit and the LCD panel;
curing the photocurable adhesive composition; and
mounting the backlight unit and the LCD panel on a frame.

20. The method as claimed in claim 19, wherein the photocurable adhesive composition is applied to a thickness of about 150 μm or less.

21. The method as claimed in claim 19, wherein curing the photocurable adhesive composition includes irradiating the photocurable adhesive composition at about 10,000 mJ/cm$^2$ or less.

22. The method as claimed in claim 19, wherein curing the photocurable adhesive composition is performed prior to mounting the backlight unit and the LCD panel on the frame.

23. The method as claimed in claim 19, wherein mounting the backlight unit and the LCD panel on the frame is performed prior to applying the photocurable adhesive composition to the adjacent sides of the backlight unit and the LCD panel.

24. The method as claimed in claim 19, further comprising injecting a thermoplastic resin into a space formed by mounting the backlight unit and the LCD panel to the frame, the space being surrounded by the LCD panel, the cured photocurable adhesive composition, and the frame.

25. The method as claimed in claim 24, wherein the thermoplastic resin has a viscosity of about 300 to about 1,200 cps at 120 to 130° C.

26. The method as claimed in claim 24, wherein the thermoplastic resin includes at least one selected from the group of hot-melt type silicone adhesives, ethylene-vinyl acetate resins, ethylene acetate-free vinyl resins, and acrylic resins.

27. The photocurable adhesive composition as claimed in claim 1, wherein the carboxyl group containing vinyl monomer includes (meth)acrylic acid, itaconic acid, maleic acid, or fumaric acid.

28. The photocurable adhesive composition as claimed in claim 6, wherein the carboxyl group containing vinyl monomer includes (meth)acrylic acid, itaconic acid, maleic acid, or fumaric acid.

29. The photocurable adhesive composition as claimed in claim 12, wherein the carboxyl group containing vinyl monomer includes (meth)acrylic acid, itaconic acid, maleic acid, or fumaric acid.

30. The photocurable adhesive composition as claimed in claim 1, wherein the photocurable monomer includes:
    about 20 wt % to about 40 wt % of the hydroxyl group containing (meth)acrylic acid ester,
    about 40 wt % to about 60 wt % of the C4 to C20 alicyclic ring containing (meth)acrylic acid ester, and
    about 1 wt % to about 20 wt % of the carboxyl group containing vinyl monomer, all wt % being based on a total weight of the photocurable monomer.

31. The photocurable adhesive composition as claimed in claim 6, wherein the photocurable monomer includes:
    about 20 wt % to about 40 wt % of the hydroxyl group containing (meth)acrylic acid ester,
    about 40 wt % to about 60 wt % of the C4 to C20 alicyclic ring containing (meth)acrylic acid ester, and
    about 1 wt % to about 20 wt % of the carboxyl group containing vinyl monomer, all wt % being based on a total weight of the photocurable monomer.

32. The photocurable adhesive composition as claimed in claim 12, wherein the photocurable monomer includes:
    about 20 wt % to about 40 wt % of the hydroxyl group containing (meth)acrylic acid ester,
    about 40 wt % to about 60 wt % of the C4 to C20 alicyclic ring containing (meth)acrylic acid ester, and
    about 1 wt % to about 20 wt % of the carboxyl group containing vinyl monomer, all wt % being based on a total weight of the photocurable monomer.

\* \* \* \* \*